US011112250B1

(12) United States Patent
Monsarrat

(10) Patent No.: US 11,112,250 B1
(45) Date of Patent: Sep. 7, 2021

(54) SYSTEM FOR AUTOMATIC INSTANTIATION OF A GENERICALLY DESCRIBED LOCATION-BASED TRAVELING EXPERIENCE TO SPECIFIC MAP COORDINATES AND REAL-TIME CONDITIONS

(71) Applicant: Monsarrat, Inc., Cambridge, MA (US)

(72) Inventor: Jonathan Monsarrat, Cambridge, MA (US)

(73) Assignee: Monsarrat, Inc., Cambridge, MA (US)

(*) Notice: Subject to any disclaimer, the term of this patent is extended or adjusted under 35 U.S.C. 154(b) by 171 days.

(21) Appl. No.: 16/242,777

(22) Filed: Jan. 8, 2019

Related U.S. Application Data

(60) Provisional application No. 62/616,028, filed on Jan. 11, 2018.

(51) Int. Cl.
| | |
|---|---|
| *G01C 21/00* | (2006.01) |
| *G01C 21/20* | (2006.01) |
| *G01C 21/34* | (2006.01) |

(52) U.S. Cl.
CPC .......... *G01C 21/20* (2013.01); *G01C 21/343* (2013.01); *G01C 21/3446* (2013.01); *G01C 21/3484* (2013.01)

(58) Field of Classification Search
CPC .. G01C 21/20; G01C 21/343; G01C 21/3446; G01C 21/3484
See application file for complete search history.

(56) References Cited

U.S. PATENT DOCUMENTS

| | | | | |
|---|---|---|---|---|
| 2005/0216181 A1* | 9/2005 | Estkowski | ........... | G05D 1/0212 701/411 |
| 2011/0208425 A1* | 8/2011 | Zheng | ..................... | G01S 19/14 701/532 |
| 2013/0339098 A1* | 12/2013 | Looman | ............... | G06Q 10/047 705/7.36 |
| 2019/0265055 A1* | 8/2019 | Chen | ...................... | G06Q 10/02 |
| 2020/0049522 A1* | 2/2020 | Wang | ................. | G01C 21/3446 |

* cited by examiner

*Primary Examiner* — Jonathan M Dager
*Assistant Examiner* — Charles Pall
(74) *Attorney, Agent, or Firm* — David J. Thibodeau, Jr.; VLP Law Group LLP

(57) ABSTRACT

A location-based user experience is provided that takes place at pinpoint map locations, along paths, or inside regions. Users (players) physically move through a real world location (such as a neighborhood) to these disparate locations to get the experience. The experience is first defined generically, by using a mobile device to physically walk through a map space, for example, by using a computer to click on a map Inputs may also include map metadata, real-time conditions such as weather, and user experiences such as keeping line-of-sight between locations. A graph drawing algorithm may then instantiate the location-based experience along specific map locations and routes near a given starting point. Time-of-travel distances based on routes may be used instead of as-the-crow-flies distances. Placement of locations and routes may also adapt to prefer or avoid certain map coordinates.

18 Claims, 7 Drawing Sheets

Heat Map 501

Vector Map 502

Nearby Users 503

Nearby Groups 504

Physically Walks a Path 202

| Named Locations 203 |
|---|
| 1. Dorothy's Home |
| 2. Munchkinland |
| 3. Corn Field |
| 4. Junk Yard |
| 5. Forest |

Path and Location Properties 204

- 1. Dorothy's Home:
    - is: urban, restaurant
    - close to: park, theatre, hotel, restaurant
    - point location
    - unowned
- Path 1 to 2:
    - length: 0.22 miles
    - transit-allowed: walk
    - transit-time: 3 minutes, 15 seconds
    - zigzag: 10%
    - heading: 180 degrees (due south)
    - keep-line-of-sight: no

301 Example HTML that Scales to Fit

```
<style>
.mybox { min-width: 100px; width: 30%; float: left; padding: 10px; }
#mainarea { width: 100%; text-align: center; }
</style>
<div id="mainarea">
    <div class="mybox">box one</div>
    <div class="mybox">box two</div>
    <div class="mybox">box three</div>
</div>
```

Example LBTE Script that Scales to Fit
302

```
<style>
.walk {
      length-min: 0.2 miles; transit-time-max: 20.2 minutes;
      keep-siblings-close: 5 minutes;
      keep-line-of-sight: no; zigzag: 0%;
      take-common-routes: yes; cross-streets: allowed;
      direction: closest( "park", 5 miles );
      transit-allowed: walk, run; self-crossing: no;
      }
#Wizard_of_Oz {
      type: region;
      child-locations: sequence-loop;
      weights: -5 witch, -2 monkeys, 1 closest( users, 0.1 miles );
      }
#Forest {
      type: point; is: urban, is-not: commercial;
      map-attribute: park; near-users: 0.5 miles;
      }
</style>
<location id="Wizard_of_Oz" class="walk">
    <location id="Dorothys_Home" />
    <location id="Yellow_Brick_Road">
        <location id="Munchkinland" />
        <location id="Corn_Field" />
        <location id="Junk_Yard" />
        <location id="Forest" />
        <location id="Emerald_City" near_to="Dorothy's Home" />
    </location>
    <location id="Witchs_Castle" />
</location>
```

Instantiation of LBTE
303

```
place( "Wizard_of_Oz", "101 Main St, Boston, MA" );
```

FIG. 3

Heat Map 501
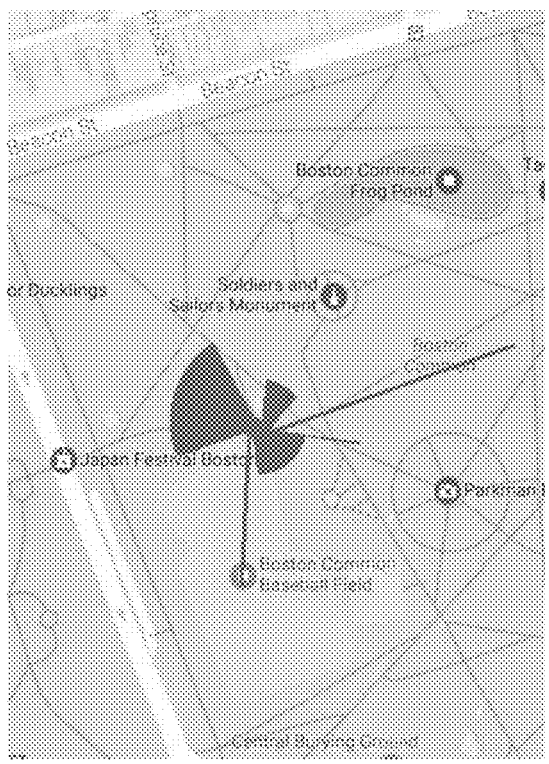
Vector Map 502
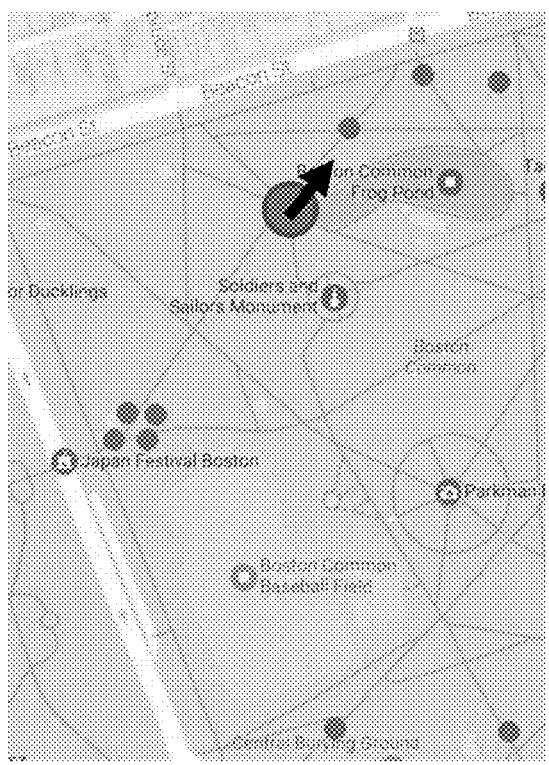
Nearby Users 503
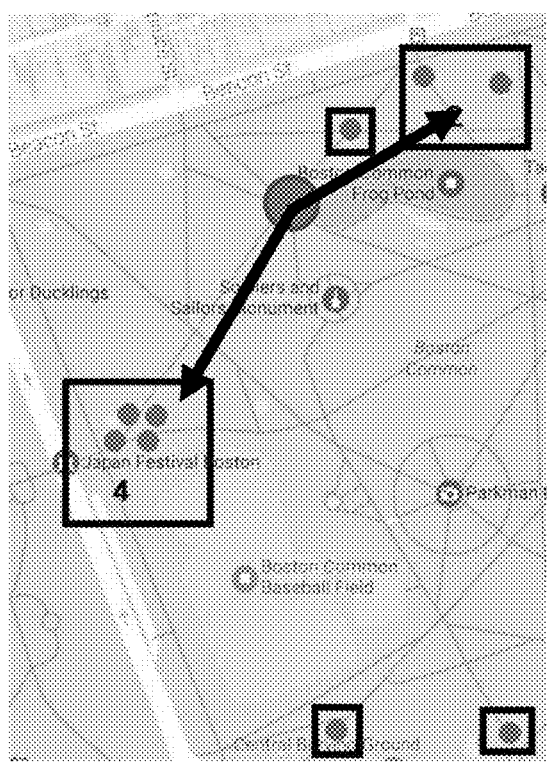
Nearby Groups 504
FIG. 5

Algorithm for Laying Out LBTE Locations
601

- Start with:
  - A directed graph of locations and route constraints.
  - An initial starting location and optionally a bounding region.
  - An optional "travel goal" the user prefers to head towards.
- Iterate:
  - Make a new map placement for all LBTE locations, either pseudorandomly within the parent location, respecting location constraints, and nearby the given initial location.
  - Iterate:
    - Calculate routes between locations.
    - Do we satisfy all constraints? Then exit. Done!
    - Use a weighted scoring system to sum all constraint violations into variable CV.
    - Is CV worse than the last iteration of this loop? Then exit, we'll need to try a different initial positioning.
    - Generate "forces" that decide how locations get adjusted:
      - Overly long route? Push in direction for shorter.
      - Overly short route? Push in direction of longer.
      - Route violates constraints? Use map logic.
    - Calculate new map placement for every location:
      - Based on its current map placement
      - But in the direction of the sum of all pushes
      - But respecting location constraints.

Complications:
- To avoid local maxima, try several initial positions even if a good solution is found.
- Routes are complicated. Moving locations close to each other may push them farther from highway exits and make the route actually longer. So take into account the direction of travel suggested by map routes.
- When several locations share constraints, for example a requirement that 5 locations each be a church, iterate through combinations of which location gets which nearby church.
- Public transit schedules.
- Initial setups need not be completely random. Locations could be laid out in an initial grid by sibling order.
- Locations may be regions, not pinpoints. A region location element with child location elements could be laid out hierarchically.
- Because users are expected to traverse the locations, we expect mostly linear graphs with fewer than 100 locations. So we don't care about compute time.
- We may need to reroute in real-time based on user feedback.

FIG. 6

Example of an LBTE Placed Onto a Map

SYSTEM FOR AUTOMATIC INSTANTIATION OF A GENERICALLY DESCRIBED LOCATION-BASED TRAVELING EXPERIENCE TO SPECIFIC MAP COORDINATES AND REAL-TIME CONDITIONS

CROSS REFERENCE TO RELATED APPLICATIONS

This application claims the benefit of a U.S. Provisional Patent Application entitled "A System for Automatic Instantiation of a Generically Described Location-Based Travelling Experience to Specific Map Coordinates and Real-Time Conditions", Ser. No. 62/616,028 filed Jan. 11, 2018, the entire content of which is hereby incorporated by reference.

BACKGROUND

In a location-based traveling experience (LBTE), a user is told to travel through the real world as part of a user experience, which could be educational or entertainment, and could involve being guided in real-time by a mobile device.

For example, in a "Wizard of Oz" themed augmented reality experience laid out in New York City, the user could first visit the "Munchkins" at an actual, physical address on $42^{nd}$ street. Then the user follows the Yellow Brick Road by physically walking to a new real-world "encounter location" on $43^{rd}$ street, where they meet the Scarecrow. The user then finds the Tin Man on $44^{th}$ street, a Lion at $45^{th}$ street, and finally Oz itself on $46^{th}$ Street. Each such encounter location is found in a different place in the real world.

SUMMARY

Filling the world with enough content to please every potential player is a burden to LBTE developers. With Pokémon Go, rural areas had very little content, making gameplay unattractive or impossible. How can a developer ensure that the Wizard of Oz experience is available to everyone, without requiring them to physically come to New York, and without the developer manually configuring how the LBTE is to be routed onto every map in every local neighborhood of the world?

Just as modern websites are designed with HTML to automatically resize, to fit any size Web browser, a flexible solution for LBTEs is needed. LBTE designers should be able to use their mobile device or personal computer to create a generically defined LBTE without reference to specific real world map coordinates. Algorithms on the LBTE server then could automatically instantiate the LBTE, fitting it onto any real world map area and accounting for real-time conditions.

Briefly, the techniques described herein assume that an LBTE server exists with a system for building LBTEs that take place along a series of disparate locations and routes in the real world. Users are meant to transit from one location to another as part of experiencing the LBTE. Locations can be placed in a series, as in following the Yellow Brick Road example, or at random, such as searching for Easter eggs, or meant to be experienced in a more complicated ordering.

The techniques begin by defining a language that specifies the routes and locations of an LBTE, giving parameters for the locations and routes desired to fit that experience. An LBTE pathway described in this language may be comprised from a hierarchy of location elements. Location elements may be bound to a map pinpoint or represent an entire region. Location elements have parameters that specify:
- where each location is to be placed relative to other location elements, and
- the routes that users are meant to take coming into or leaving the location.

Locations may be described without referencing specific map coordinates, for example, by reference to:
- Map attributes such as "pharmacy" or "park",
- Map regions with historical data on user travels or ratings,
- Paid sponsor locations,
- How close locations should be to each other, by distance or by travel time with a specified mode of transportation,
- Maze-like routes intended to take an LBTE user to every part of an area, for example visiting each portion of a shopping mall or park, or
- Routes that minimize street crossings.

Location elements may contain smaller, nested LBTEs. LBTEs may be required to chain together with other LBTEs. Or several LBTEs may be forbidden from having routes and locations that overlap. As with HTML, child elements may be constrained by or inherit parameters from parent elements.

The LBTE layout may be constrained by real-time information such as:
- The temperature, time of day, weather, and public transit schedules,
- The location and destination of other LBTE users,
- Street closings, location closings, and events such as festivals,
- Real-time bids on sponsored locations, for example to draw customers to a restaurant that is sometimes filled to capacity but now has empty tables, The LBTE is instantiated with some given initial location chosen by the user or automatically chosen by the LBTE system.

Then an algorithm, using map data and starting with the chosen initial location, computes a depth-first search of the local map area, laying down the LBTE locations and routes in-between them to maximize a scoring system and to obey constraints.

In addition, administrators may be able to manually lay out or constrain instantiations of an LBTE route, by setting additional map metadata. For example, LBTEs may be forbidden from map areas marked off-limits, or an LBTE may be forced along preset locations that define a museum guided tour or a historic walking trail. LBTEs may be further configured by users of the LBTE, or by government and legal owners of a map locations.

When users arrive at or leave from a location, this may trigger software to execute ("an event is called"), like how mousing over a website HTML element can trigger software to run.

The challenges are then:
a) What is the best way for a language to refer to locations and routes?
b) What types of constraints, map metadata, and real-time information should be specifiable in the language?
c) What is the best way for an administrator to manually instantiate an LBTE and manually specify some portion of its locations and routes?
d) What is the best way to use historical data to optimize locations and routes?
e) What is the best way for an LBTE to be instantiated, placing its routes and locations onto a physical map, in the real world?

These problems are solved with a method according to a preferred embodiment in the following way:

a) The language for LBTEs requires the coder to define one or more location elements, each of which refers to a pinpoint or regional location, with specified incoming and exiting routes. Leaf elements are locations and parent elements define routes in-between locations and location properties to be inherited by children. Some parameters can be left unspecified, to be optimally fitted.

b) Locations and LBTEs may be configured with:
   Map descriptors that refer to map metadata, including metadata about organizations and locations on the map;
   Real-time descriptors, for example whether locations are open or closed, or the behavior of other users,
   Experiential descriptors, for example whether line-of-sight between locations should be kept or avoided, the mode of transportation users are expected to employ or whether the entire route needs to be completed within a set time,
   Nesting and inheritance, so that large LBTEs can be assembled from contained smaller LBTEs.

c) An administrator with a mobile device or computer might lay out an LBTE route manually by:
   physically moving from one location to the next in the real world;
   selecting points on a map for each stop in the LBTE route; or
   defining custom typed map metadata that the LBTE is coded to respond to d) Historical data on user movements can be collected and applied as map metadata marked locations and routes good or bad. Users may be able to rate map locations. Users may be able to request a real-time re-routing of the LBTE.

e) An LBTE can be instantiated, having its locations and routes laid out on a real map, through a flow based layout model where each leaf node in sequence is placed relative to an initial location. An advanced force-direct graph drawing algorithm identifies possible location placements relative to element constraints. The result can be a finished layout, or an error that no layout could be found, perhaps with a suggested best-fit layout.

BRIEF DESCRIPTION OF THE DRAWINGS

The foregoing and other features, and advantages will be apparent from the following more particular description of preferred embodiments, as illustrated in the accompanying drawings in which like reference characters refer to the same parts throughout the different views.

FIG. 3 is an example implementation of a computer language.

FIG. 5 shows how previous user path and location information may be used to build new routes.

FIG. 6 is the algorithm for instantiating and laying out an LBTE on a map.

DETAILED DESCRIPTION

A description of preferred embodiments follows.

Setting LBTE Locations and Paths From Home

Figure 1:
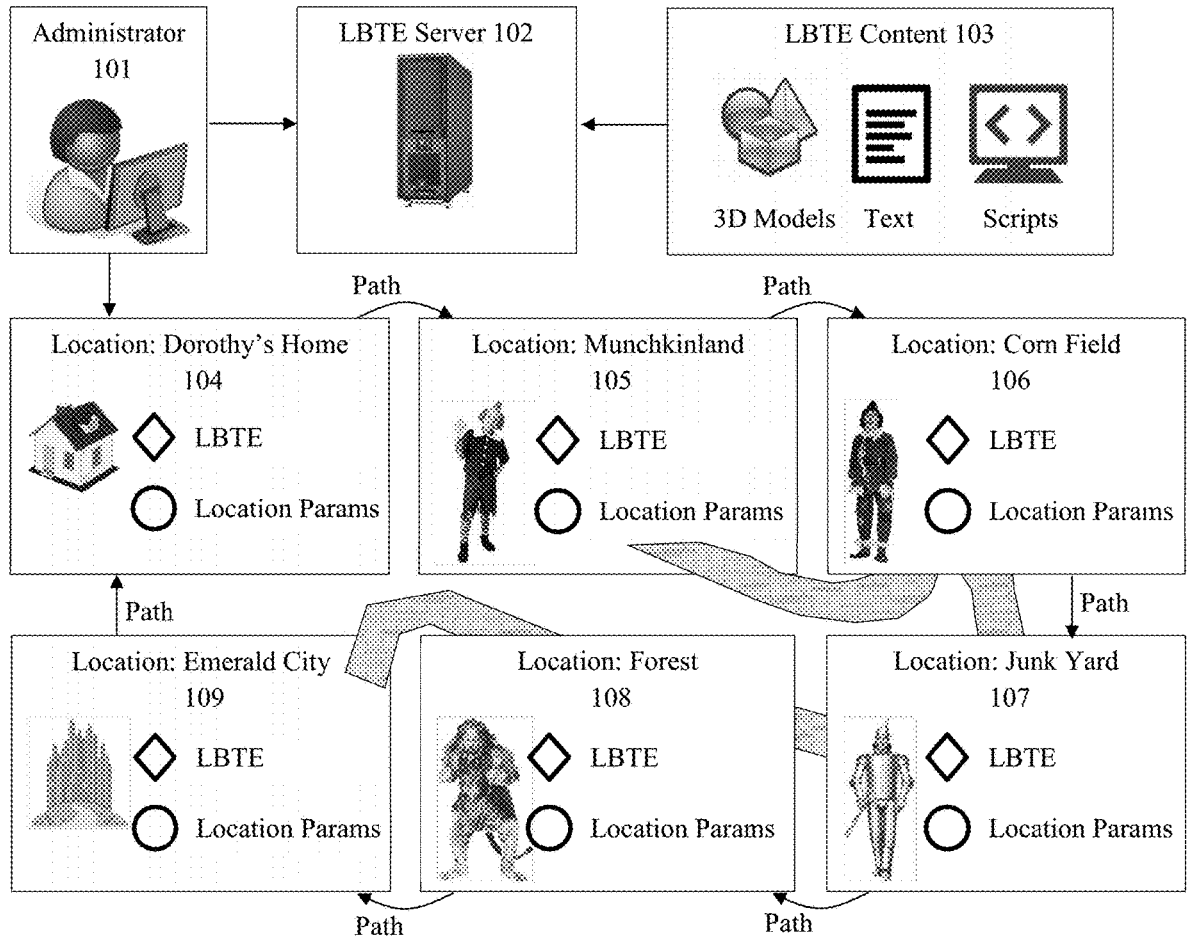
FIG. 1 shows a typical LBTE route being configured for automatic layout.

FIG. 1 shows how LBTE locations and paths can be set up for replication across a variety of map areas.

The Administrator 101 may use a mobile device, smart phone, tablet, laptop, personal computer or some other data processor to access an LBTE Server 102 which contains LBTE Content 103 such as 3D models, text, and scripts to animate characters or otherwise describe the LBTE world.

In this case, the Administrator 101 is creating a "Wizard of Oz" themed experience with six locations. The experience begins at Location: Dorothy's House 104, which is associated with Location Parameters 110 that tell the LBTE Server 102 where to place Location: Dorothy's Home 104 in a given map region, for example:

Whether the site must be positioned at, or close to:
   A street address,
   Latitude and longitude map coordinates,
   A map place with tags such as "school", "safe", or "indoors", some of which may vary such as a store tagged "open",
   Map locations that are "owned" or given alternate names by an entity in the LBTE,
   The real-time or historic locations of other users and objects in the LBTE,
   Ratings that other users have given this location, e.g. for safety,
Whether this location is a point on the map or a region,
And if a region, minimum and maximum sizes, for example, a public park but not a tiny one.

After experiencing whatever LBTE 104 is associated with Location: Dorothy's Home 104, the user is expected to travel physically to another location in the real world which represents Location: Munchkinland 105.

This path between two locations can also have its own Path Parameters 111, such as:
   A set distance to travel, or minimum and maximum bounds,
   A set time to travel, or minimum and maximum bounds, with a speed of travel set in mph or kph, or automatically calculated via transit mode allowed, such as walking, running, car, and public transit.
   Whether only line-of-sight paths are allowed, and whether the path should zigzag or go as straight as possible,
   Whether the path should be a closed path, returning to its origin,
   The general direction that the path should head in, as set by a compass heading or Location Parameter 110, which naturally will impact the placement of Location: Munchkinland 105,
   Weightings to specify whether the map should favor or avoid specific map descriptors. For example, a path that must heavily try to stay within parkland but only slightly try to avoids commercial locations within the park might be:
      weightings:
         5 "park", #attract
         −2 "commercial property"; #avoid
   Whether the path may cross itself,
   The real-time location and travel vector of users, singly or in groups, and the real-time location of LBTE objects or creatures that may move, and
   The bounding-region that the path must be contained in.

Using Location Parameters 110 and Path Parameters 111, the Administrator 101 configures the rest of the adventure:

1. How to choose a place for Location: Dorothy's Home 104, which should be a residential address close to a park,
2. How to lay the path to Location: Munchkinland 105, which should be direct but not too close,
3. Where to set Location: Munchkinland 105, which should be in a park of a given size,
4. How to lay the path to Location: Corn Field 106,
5. Where to set Location: Corn Field 106, which is not a point on the map but rather an entire region that the user must explore to find the scarecrow,
6. How to lay the path to Location: Junk Yard 107,
7. Where to set Location: Junk Yard 107, near a map place labeled "factory", "junk yard", or "electronics" if possible,
8. How to lay the path to Location: Forest 108, which should be in a park,
9. Where to set Location: Forest 108, which should not be close to other users or any map places—as isolated as possible given other parameters,
10. How to lay the path to Location: Emerald City 108,
11. Where to set Location: Emerald City 109, which should be outside of any park, ideally at a map location labeled "skyscraper", and
12. How to close the path by returning to Location: Dorothy's House 104.

If the LBTE requires a variety of different paths, such as a detour to the Witch's Castle, or a retreat from the Scarecrow back to the Munchkins, these paths would be defined separately and referenced on the LBTE Server 102. LBTEs can also be set up as just a set of locations without any specified routes in-between them, for example, an Easter egg hunt, where users may travel to any egg location in any order.

Setting LBTE Locations and Paths in the Field

Figure 2:
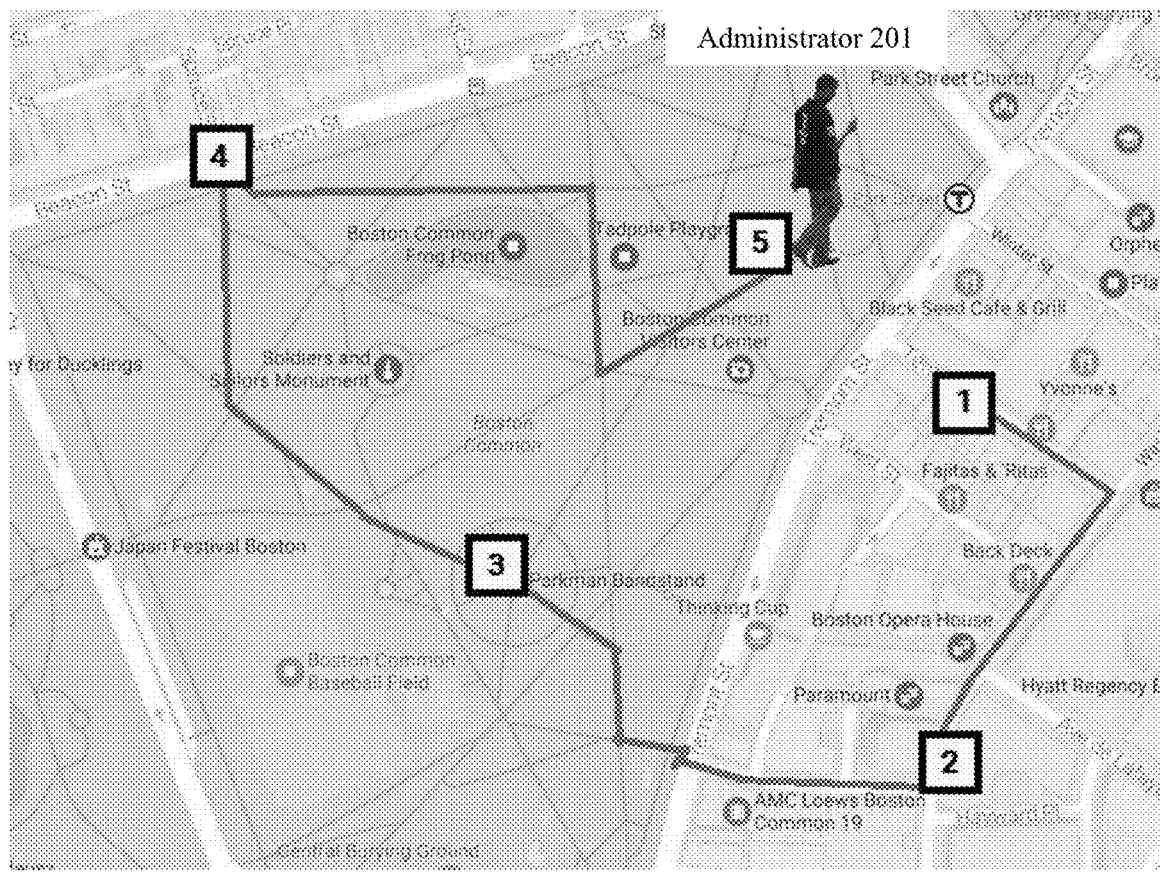
FIG. 2 shows how an administrator can use a mobile device to lay out and configure an LBTE route by walking that route in person.

FIG. 2. shows an example of how an administrator may use a mobile device such as a smartphone or tablet to instantiate an LBTE and then physically walk through a map area, marking locations and paths.

The Administrator 201 Physically Walks a Path 202 through the city streets and nearby park, to locations 1, 2, 3, 4, 5, following a set path.

The Administrator gives Names to Locations 203, for easy reference.

Then the system generates Path and Location Properties 204, which can be used as parameters to instantiate the LBTE in other map areas. Or the Administrator 201 could copy and paste the Path and Location Properties 204 into a script for manual tweaking of what's important "close to park" and removal of what's unimportant "close to hotel".

In this case the discovered Path and Location Properties 204 include:
That the selected location for Dorothy's Home:
Is tagged as "urban", which was intentional, and "restaurant", which was accidental and may be removed,
Is close to locations tagged as "park", which was intentional, and to "theatre", "hotel", and "restaurant", which were accidental,
Is a point instead of a region location
Is not owned by any user or organization, e.g. school grounds
That the traversed path from location 1 to location 2:
Had a length of 0.22 miles and took 3 minutes, 15 seconds,
Had a GPS record that seemed to indicate walking, not another mode of transit like running or a car,
Had a zigzag coefficient indicating that it was mostly but not entirely straight,
Headed in a southerly direction from 1 to 2, and
Ignored any need for a line-of-sight between location 1 and 2.

An Example Script for Configuring LBTE Locations and Paths

FIG. 3 gives an example script for how LBTE locations and paths may be configured by code to be executed on the LBTE server.

The script here is presented as an Example HTML, that Scales to Fit 301, and is not necessarily a required part of the system or methods described herein, but serves as an analogy. The development of Web pages must be done so that the page is laid out properly no matter what size the device and Web browser window showing the page. When conflicts emerge, such as there being not enough room in a bounding box to lay out the contained boxes, an error is given or the browser makes its best guess about which rule to break to resolve the conflict.

In the Example LBTE Script that Scales to Fit 302, the administrator has used a mobile device or personal computer to write a script (or an automation tool that generates scripts) that executes on the LBTE server in real-time:

A class "walk" is defined, so any location with this class has routes that:
Have a minimum length of 0.2 miles,
Have no requirement to keep a line-of-sight between starting and ending locations,
Should run in a straight line as much as possible, without zigzag,
Should follow routes that historically have been common for other users,
May cross streets, and
Should generally head in the direction of the closest park.
Has a maximum transit time of 20.2 minutes, as interpreted by walking or running,
May not cross itself,
A specific location named "Wizard of Oz":
Whose child locations are placed in a closed loop sequence, not randomly like an Easter egg hunt,
Is entirely contained inside the map region "Boston, Mass.",
Attempts to avoid real-time LBTE objects denoted by name "witch" and tag "monkey", with weights of −5 and −2, which indicate strong avoidance,
Attempts to come into contact with other users in the LBTE, with a weight of 1, which indicates mild interest.
A specific location named "Forest" that is:
A location of type point, not region
To be located in an urban environment but not a commercial zone,
To be located on a map designation "park" and within 0.5 miles of other users.
Then, a location "Wizard of Oz" that has three children, of which one, "Yellow_Brick_Road", itself has five children. The nested paths inherit properties such as "cross-streets" from "Wizard_of_Oz".

How close should these locations be to one another? In the case of an Easter egg hunt, locations can be random and unaffiliated with each other. However, the hierarchical nature of the coding language allows easy positioning of siblings. By using the "keep-siblings-close" label, we (e.g., the algorithm) can force every sibling in locations of class "walk" to be close on the map to each other, with closeness parameters inherited from Wizard_of_Oz:

Munchkinland should be placed a short walk from Dorothy's Home because it is the next sequential leaf node.

Corn Field is next and should be placed close to Munchkinland.

Junk Yard is next and should be placed close to Corn Field.

Forest is next and should be placed close to Junk Yard.

Emerald City is next and should be placed close to Forest.

Witch's Castle is next and should be placed close to Emerald City.

However, more complicated relationships are possible. For example, at the end of the LBTE, users must return from Emerald City back to Dorothy's Home, so these locations should be close on the map, even though they are not leaf siblings. Such relationships may be specified in the code by adding "near_to" to "Emerald City", implying a bidirectional closeness. (Because of one-way streets and other transportation oddities, closeness in one direction does not always imply closeness in the reverse direction.)

The closeness parameters would be inherited from Wizard_of_Oz. Or routes between locations could be explicitly configured, one by one.

In 303 Instantiation of LBTE, the "Wizard_of_Oz" experience is laid down with its root element initialized at map location "101 Main St, Boston, Mass.".

Just as with HTML code, if the LBTE server finds configuration conflicts, it must resolve them. For example:

An attempt to lay down this LBTE in the ocean fails,

An attempt to lay down this LBTE in a place with no nearby park fails, as required for #Forest, and The six nested paths inherit "keep-siblings-close: 5 minutes" from class "walk", but with 7 leaf siblings this creates a path of 35 minutes, violating the "walk" class being "transit-time-max: 20.2 minutes". The system could suggest which conflicting rule should be broken.

Of course, many other kinds of language implementation are possible, including one that permits referring to routes by name. That would permit description of complicated many-to-many location relationships better the implied series of locations created by leaf siblings in a hierarchy.

Example Data Objects for LBTE

Figure 4:
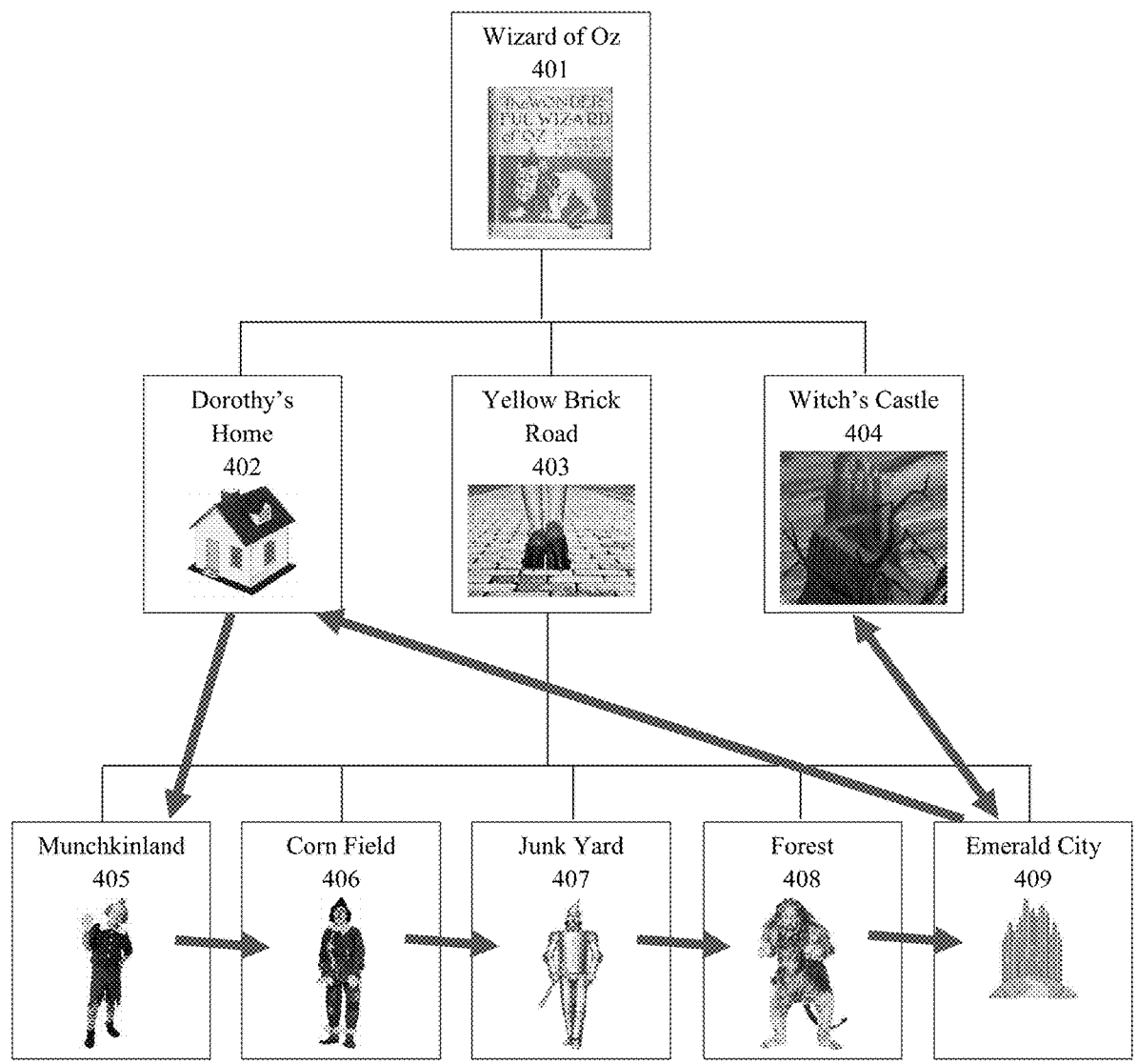
FIG. 4 shows the data tree computed by parsing the computer language in FIG. 2.

FIG. 4 shows the data objects computed by parsing the computer code in FIG. 2. First are the inheritance relationships. Wizard of Oz 401 is the root location that contains the entire LBTE and may be limited to a map region, so that all user activity takes place within that region.

Dorothy's Home 402, Yellow Brick Road 403, and Witch's Castle 404, are child locations within Wizard of Oz 401. They are laid out on a map inside Wizard of Oz 401 and inherit its properties.

Likewise, Munchkinland 405, Corn Field 406, Junk Yard 407, Forest 408, and Emerald City 409 are child locations within Yellow Brick Road 403. Locations may not necessarily be intended for sequential play.

Second are the closeness relationships, shown by arrows, that constrain how locations are placed next to other locations: their minimum and maximum distance, and whether routes for example may cross streets. All these route parameters are defined in class "walk" and inherited.

How Real-Time and Historic Information May be Used

FIG. 5 gives examples of how real-time and historic information about the locations and paths of users, LBTE objects, and other LBTEs may be used in the configuration of a fresh LBTE.

The scripting language used to configure LBTE paths and locations can make reference to historic and real-time information about users and LBTE objects in the location-based travel experience. For example:

Heat Map 501 identifies the areas of the park that are more commonly and less commonly traveled, so that a user may be sent to the Cowardly Lion in a location more likely to be scarier because it is more isolated from other users.

Vector Map 502 identifies, for a given point on the map, which direction users historically traveled in. This may be used, for example, to resolve conflicts or break ties about which direction a path should travel in.

Nearby Users 503 shows the location of the nearest user (or LBTE object), which could be used as the compass heading for laying down a path or placing a fresh LBTE object.

Nearby Groups 504 groups together users (or LBTE objects) that are within socializing distance of each other. In this case, two choices emerge. The configuration will specify whether it is better to direct a path east towards the closer group of users (but there are only 2 of them) or towards a crowd of 4 users to the southwest that is slightly farther.

Algorithm for Laying Out LBTE Locations

FIG. 6 shows one possible algorithm for automatically using configuration information to lay out the locations and paths of an LBTE on some given map location.

The algorithm is an advanced force-directed graph drawing algorithm that places a graph of nodes and directed edges, the locations and routes, onto a two-dimensional space, a real-world map.

To begin, we (e.g., the algorithm) loads an initial starting location where this LBTE will be instantiated. This location is either chosen by the user or assigned by the LBTE system. We may also assign a destination direction or map location, a travel goal, where the user wishes to go to. For example, a user who is walking eastwards for other reasons might like to have an LBTE that is primarily laid down in an eastward direction.

The algorithm may be doubly iterative. First, it iterates through a variety of random initial map placements of locations and routes. Second, it iterates through minor readjustments to the locations and routes.

First Iteration: Initial Placement

The first iteration may be truly random, placing LBTE locations on the map anywhere inside an optional bounding region. However, it may also be pseudorandom, for example, identifying a primary series and laying it out along a straight line or closed loop with consistent spacing. For example, in Example LBTE Script that Scales to Fit 302 we saw that siblings should be 5 minutes' distance apart with walking allowed. Let's say that's 0.25 miles in-between locations. The locations do not go in a pure series because of the Witch's Castle 404, but there is a long circular series from Dorothy's Home 402 to Munchkinland 405 to Corn Field 406 to Junk Yard 407 to Forest 408 to Emerald City 409 to Dorothy's Home 402. This could be laid out on a map in a circular grid fashion with separation of 0.25 miles instead of truly randomly.

An initial placement should also respect location constraints. For example, if Forest 408 is constrained to be near map attribute "park", the initial placement should put Forest 408 on some park on the map, not at any random place.

Second Iteration: Readjustment

Once an initial placement has been made, the second iteration measures the location and route errors in a way that suggests a repositioning. For example, if two locations are supposed to be separated by 0.25 miles, but after random placement they are actually separated by 0.1 miles, they need to be pushed further apart. We (e.g., the algorithm) create a movement vector (a "force") on each of the locations that tends to push them apart. Conversely, two locations that are too distant from each other should have movement vectors that tend to push them closer together.

If there are no significant forces, and all constraints are obeyed, then we have a successful solution and the algorithm is complete. All iteration is stopped.

However, if sizeable forces remain, the locations are not yet in an optimal position. A readjusted map position is then calculated for every location based on a superposition of every force vector on those locations.

Complications

Location and route constraints cause complications that require map logic to be used. For example, if Forest 408 is constrained to be in a park, the algorithm can either reposition it elsewhere inside its current park location, move it into a new park, or break the constraint.

Also, locations that get moved closer together can sometimes have longer travel times, if travel type is vehicle and they are moved farther from highway exits, or if one-way streets are involved. The algorithm can therefore remember the distance between locations for each iteration and notice whether "closer" locations are actually moving farther away as calculated by travel time. In that case, locations can be moved "closer" based on route vectors instead of "as-the-crow-flies" vectors. The presence of high-speed roads in a route also helps decide whether "closer" really means closer.

Like all force-directed graph drawing algorithms, the system and methods described herein do not scale well to hundreds or thousands of locations and routes. However, since we expect users to physically travel from location to location as part of an LBTE, we can reasonably expect most LBTEs to contain fewer than 100 locations to be placed on a map.

Analyzing the constraints, a "bounding area" for the LBTE can be created. For example, with our Wizard of Oz example in FIG. 3, with an average distance of 0.25 miles in-between 7 leaf nodes, we know that the LBTE fits inside a square of 1.75 miles×1.75 miles, and probably much smaller. A bounding area can reduce the complexity of finding a solution. For example, we (e.g., the algorithm) might begin by finding a solution for the Yellow Brick Road 403 as a bounding box (ignoring its five children) with respect to its siblings Dorothy's Home 402 and Witch's Castle 404. Then we could fill in the five children of Yellow Brick Road 403 inside that bounding box. Bounding boxes also reduce the complexity of laying out hundreds or thousands of different LBTE instantiations onto a single map without overlap, if that is important to the system.

Example of an LBTE Placed onto a Map

Figure 7:
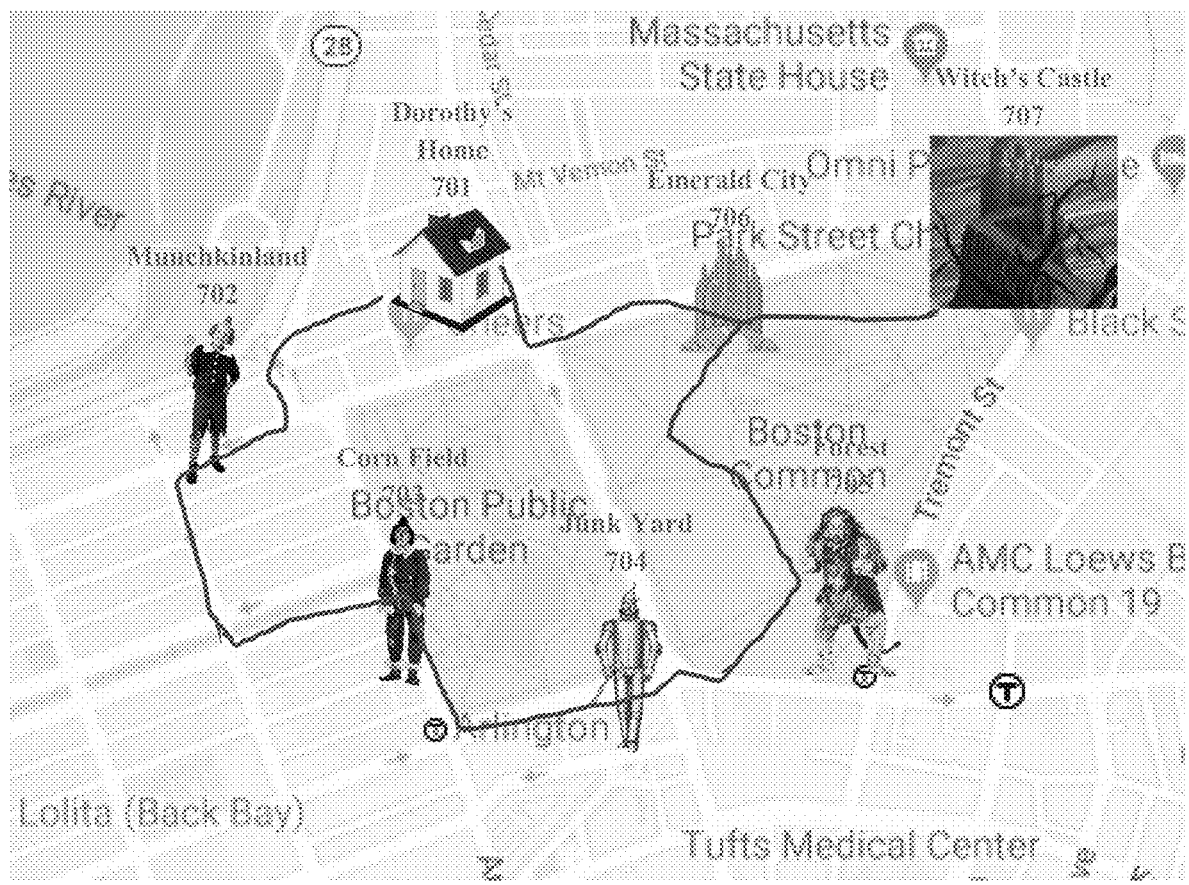
FIG. 7 is an example of the algorithm being executed to lay out a route.

FIG. 7 shows the Wizard of Oz locations from FIG. 3 and FIG. 4 instantiated onto a map. Routes computed between locations may be used as part of the LBTE, for example, following a Yellow Brick Road, or may serve merely as possible routes used to position LBTE locations, with users left to plan their own routes.

While various apparatus and methods have been particularly shown and described with references to example embodiments thereof, it will be understood by those skilled in the art that various changes in form and details may be made therein without departing from the scope of the invention(s) encompassed by the appended claims.

What is claimed is:

1. A method for providing a location based travel experience (LBTE) that maps user experience locations to real world locations, comprising:
    defining one or more location elements, each of which refers to an experience location not having a predefined position on a real world map;
    generating a graph of the location elements, where nodes represent locations, and parent nodes define routes in-between locations and also define location properties to be inherited by child nodes;
    the location elements further including one or more of:
        map descriptors that refer to map metadata, including metadata about organizations and locations on the real world map;
        real-time descriptors, including at least whether locations are open or closed, or behavior of other users;
        experiential descriptors, including whether line-of-sight between locations should be kept or avoided, a mode of transportation users are expected to employ or whether the route needs to be entirely completed within a set time; and
        nesting and inheritance, such that larger LBTE may be assembled from contained smaller LBTEs; and
    laying out a route by one or more of:
        physically moving from one location to next location in the real world map and selecting points on the real world map for each stop in the LBTE route; or
        operating a flow based layout model where each node in sequence is automatically placed relative to an initial location, via a graph drawing algorithm that identifies possible location placements relative to element constraints based on a best-fit layout.

2. The method as in claim 1 further comprising:
accepting input from a user operating a mobile device to configure locations and routes by walking physically along a map.

3. The method as in claim 1 further compromising:
accepting input from a user to configure locations and routes by clicking on a map displayed on a data processing device.

4. The method as in claim 1 further comprising:
triggering execution of a software process when a user enters or leaves an LBTE location as laid out on a map.

5. The method as in claim 1 further comprising:
allow map metadata and attributes to be referred to in the graph, including identification of real world locations including parks and local businesses.

6. The method as in claim 1 further comprising:
assigning real-time environmental attributes to at least one locations, such as weather and park openings and closings.

7. The method as in claim 1 further comprising:
assigning experiential descriptors to routes, such as line-of-sight and mode of transportation.

8. The method as in claim 1 further comprising:
preferring or avoiding placement of locations at certain map coordinates based on historical user movements.

9. The method as in claim 1 further comprising:
placing locations in a hierarchy of nodes, with routes between successive nodes implied as important.

10. The method as in claim 1 further comprising:
assigning locations randomly or with given separation within a defined map region.

11. The method as in claim 1 further comprising:
placing locations at map coordinates that account for route-based travel distances instead of as-the-crow-flies travel distances.

12. The method as in claim 1 additionally comprising:
manually laying out or constraining instantiations of a route, by setting additional map metadata.

13. The method as in claim 1 wherein one or more of the locations further define a region or path.

14. A method as in claim 1
wherein the location elements each further have one or more parameters that specify
(a) where each location is to be placed relative to other location elements,
(b) routes for coming into or leaving the location, or
(c) without referencing specific map coordinates, by reference to at least one of
  (i) one or more map attributes,
  (ii) map regions with historical data on user travels or ratings,
  (iii) paid sponsor locations,
  (iv) how close locations should be to each other by distance or by travel time with a specified mode of transportation,
  (v) maze-like routes that traverse every part of an area, or
  (vi) routes that minimize street crossings.

15. The method of claim 1 wherein one or more of the location elements contains a nested set of location elements.

16. The method of claim 1 wherein one or more location elements are forbidden from having routes that overlap.

17. The method of claim 1 wherein one or more of the locations further include real-time information such as:
temperature, time of day, weather, and public transit schedules,
physical location and destination of users,
street closings, location closings, and events, or
real-time bids on sponsored locations.

18. The method of claim 12 wherein the additional map metadata includes locations forbidden from map areas marked off-limits, or forced preset locations, or by government or by and legal owners of a map location.

* * * * *